(12) United States Patent
Bi et al.

(10) Patent No.: US 8,377,847 B2
(45) Date of Patent: *Feb. 19, 2013

(54) IMAGE DESTRUCT FEATURE USED WITH IMAGE RECEIVING LAYERS IN SECURE DOCUMENTS

(75) Inventors: Daoshen Bi, Boxborough, MA (US); Tung-Feng Yeh, Waltham, MA (US); Robert L. Jones, Andover, MA (US); Brian C. Labrec, North Oxford, MA (US)

(73) Assignee: L-1 Secure Credentialing, Inc., Billerica, MA (US)

( * ) Notice: Subject to any disclaimer, the term of this patent is extended or adjusted under 35 U.S.C. 154(b) by 18 days.

This patent is subject to a terminal disclaimer.

(21) Appl. No.: 12/946,686

(22) Filed: Nov. 15, 2010

(65) Prior Publication Data

US 2011/0057434 A1    Mar. 10, 2011

Related U.S. Application Data

(63) Continuation of application No. 11/096,229, filed on Mar. 30, 2005, now Pat. No. 7,833,937.

(51) Int. Cl.
*B41M 5/50* (2006.01)
(52) U.S. Cl. ...................................... 503/227
(58) Field of Classification Search ............ None
See application file for complete search history.

(56) References Cited

U.S. PATENT DOCUMENTS

| | | | |
|---|---|---|---|
| 3,929,701 A | 12/1975 | Hall et al. | |
| 3,949,501 A | 4/1976 | Andrews et al. | |
| 4,027,345 A | 6/1977 | Fujisawa et al. | |
| 4,082,873 A | 4/1978 | Williams | |
| 4,121,003 A | 10/1978 | Williams | |
| 4,184,701 A | 1/1980 | Franklin et al. | |
| 4,773,677 A | 9/1988 | Plasse | |
| 4,876,123 A | 10/1989 | Rivera et al. | |
| 5,334,573 A | 8/1994 | Schild | |
| 5,380,695 A | 1/1995 | Chiang et al. | |
| 5,629,093 A | 5/1997 | Bischof et al. | |
| 5,658,411 A | 8/1997 | Faykish | |
| 5,660,925 A | 8/1997 | Cooley et al. | |
| 5,783,024 A | 7/1998 | Forkert | |
| 6,003,581 A | 12/1999 | Aihara | |
| 6,007,660 A | 12/1999 | Forkert | |
| 6,066,594 A | 5/2000 | Gunn et al. | |
| 6,146,741 A | 11/2000 | Ogawa et al. | |
| 6,159,327 A | 12/2000 | Forkert | |
| 6,264,782 B1 | 7/2001 | Oshima et al. | |
| 6,283,188 B1 | 9/2001 | Maynard et al. | |
| 6,284,337 B1 | 9/2001 | Lorimor et al. | |
| 6,368,684 B1 * | 4/2002 | Onishi et al. ............ | 428/32.6 |
| 6,372,341 B1 | 4/2002 | Jung et al. | |
| 6,473,165 B1 | 10/2002 | Coombs et al. | |
| 6,474,695 B1 | 11/2002 | Schneider et al. | |
| 6,660,368 B2 | 12/2003 | Cooley | |
| 6,817,530 B2 | 11/2004 | Labrec et al. | |
| 6,827,277 B2 | 12/2004 | Bloomberg et al. | |
| 7,143,950 B2 | 12/2006 | Jones et al. | |

(Continued)

*Primary Examiner* — Bruce H Hess
(74) *Attorney, Agent, or Firm* — Mintz, Levin, Cohn, Ferris, Glovsky and Popeo, P.C.

(57) ABSTRACT

An image destruct material comprises a release layer positioned between an image receiving layer and a base layer. The adhesion between the release layer and the base layer is greater than adhesion between the release layer and the image receiving layer. The release layer material can be used in secure documents that have an image receiving layer. After information is printed on the image receiving layer, an overlaminate is applied over it. Removal of the overlaminate destroys the printed image on the receiving layer because of the relative adhesive properties of the image receiving layer, overlaminate and release layer.

18 Claims, 3 Drawing Sheets

U.S. PATENT DOCUMENTS

| | | |
|---|---|---|
| 7,383,999 B2 | 6/2008 | Bi et al. |
| 7,833,937 B2 * | 11/2010 | Bi et al. ........................ 503/227 |
| 7,939,465 B2 * | 5/2011 | Bi et al. ........................ 503/227 |
| 2002/0150701 A1 * | 10/2002 | Onishi et al. .................... 428/29 |
| 2005/0114447 A1 | 5/2005 | Cameron et al. |
| 2006/0222830 A1 | 10/2006 | Bi et al. |

* cited by examiner

IMAGE DESTRUCT FEATURE USED WITH IMAGE RECEIVING LAYERS IN SECURE DOCUMENTS

RELATED APPLICATIONS

The present application is a Continuation of U.S. Patent Application 11/096,229 filed Mar. 30, 2005, now U.S. Pat. No. 7,833,937 issue Nov. 10, 2012. The contents of the above application are incorporated herein by reference in its entirety.

TECHNICAL FIELD

The invention relates to secure documents and specifically features of secure documents that make them tamper evident to deter or prevent document alteration and counterfeiting.

BACKGROUND AND SUMMARY

Identification documents (hereafter "ID documents") play a critical role in today's society. One example of an ID document is an identification card ("ID card"). ID documents are used on a daily basis—to prove identity, to verify age, to access a secure area, to evidence driving privileges, to cash a check, and so on. Airplane passengers are required to show an ID document during check in, security screening and prior to boarding their flight. In addition, because we live in an ever-evolving cashless society, ID documents are used to make payments, access an automated teller machine (ATM), debit an account, or make a payment, etc.

For the purposes of this disclosure, ID documents are broadly defined herein, and include, e.g., credit cards, bank cards, phone cards, passports, driver's licenses, network access cards, employee badges, debit cards, security cards, smart cards (e.g., cards that include one more semiconductor chips, such as memory devices, microprocessors, and microcontrollers), contact cards, contactless cards, proximity cards (e.g., radio frequency (RFID) cards), visas, immigration documentation, national ID cards, citizenship cards, social security cards, security badges, certificates, identification cards or documents, voter registration cards, police ID cards, border crossing cards, legal instruments, security clearance badges and cards, gun permits, gift certificates or cards, membership cards or badges, etc.

Many types of identification documents carry certain items of information which relate to the identity of the bearer. Examples of such information include name, address, birth date, signature and photographic image; the cards or documents may in addition carry other variable data (i.e., data specific to a particular card or document, for example an employee number) and invariant data (i.e., data common to a large number of cards, for example the name of an employer). All of the cards described above will be generically referred to as "ID documents".

Figure 1:
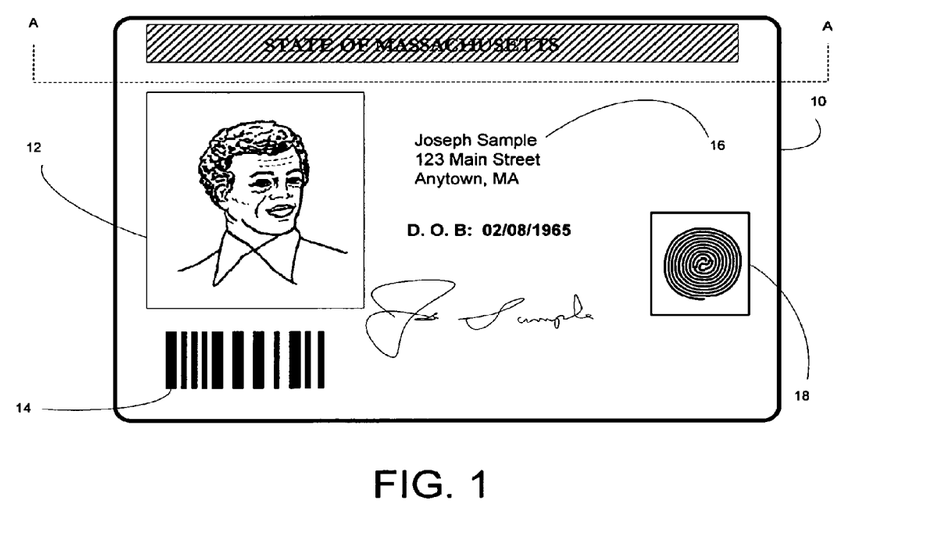
FIG. 1 is an illustrative example of an identification document.
Figure 2:
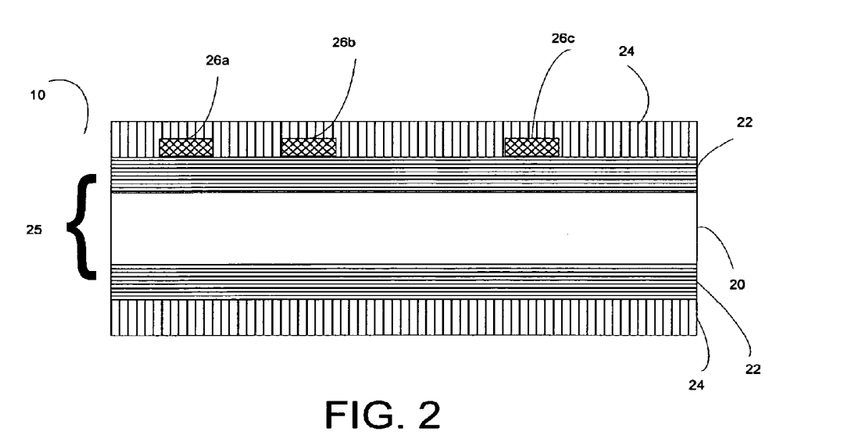
FIG. 2 is an illustrative cross section of the identification document of FIG. 1, taken along the A-A line.

FIGS. 1 and 2 illustrate a front view and cross-sectional view (taken along the A-A line), respectively, of an identification (ID) document 10. In FIG. 1, the ID document 10 includes a photographic image 12, a bar code 14 (which may contain information specific to the person whose image appears in photographic image 12 and/or information that is the same from ID document to ID document), variable personal information 16, such as an address, signature, and/or birthdate, and biometric information 18 associated with the person whose image appears in photographic image 12 (e.g., a fingerprint, a facial image or template, or iris or retinal template), a magnetic stripe (which, for example, can be on a side of the ID document that is opposite the side with the photographic image), and various security features, such as a security pattern (for example, a printed pattern comprising a tightly printed pattern of finely divided printed and unprinted areas in close proximity to each other, such as a fine-line printed security pattern as is used in the printing of banknote paper, stock certificates, and the like).

Referring to FIG. 2, the ID document 10 comprises a preprinted core 20 (also referred to as a substrate). In many applications, the core can be a light-colored, opaque material (e.g., TESLIN (available from PPG Industries), polyvinyl chloride (PVC) material, polyester, polycarbonate, etc.). The core 20 is laminated with a transparent material, such as clear polycarbonate, PVC or polyester material 22, which, by way of example, can be about 1-10 mil thick. The composite of the core 20 and clear laminate material 22 form a so-called "card blank" 25 that can be up to about 27 to 33 mils thick in accordance with ANSI standards. Information 26a-c is printed on the card blank 25 using a method such as Laser Xerography or Dye Diffusion Thermal Transfer ("D2T2") printing (e.g., as described in commonly assigned U.S. Pat. No. 6,066,594, which is incorporated by reference). The information 26a-c can, for example, comprise variable information (e.g., bearer information) and an indicium or indicia, such as the invariant or nonvarying information common to a large number of identification documents, for example the name and logo of the organization issuing the documents. The information 26a-c may be formed by any known process capable of forming the indicium on the specific core material used.

To facilitate printing of data on the card structure, an image receiving layer is applied to the card structure prior to printing for some printing technologies. One type of printing technology that uses an image receiving layer is D2T2 printing. U.S. Pat. Nos. 6,066,594 and 5,334,573 describe image receiving layers for D2T2 printing. A sheet or layer which is comprised of a polymer system of which at least one polymer is capable of receiving image-forming materials from a donor sheet upon the application of heat. The polymer system of the receiving sheet or layer is incompatible or immiscible with the polymer of the donor sheet at the receiving sheet/donor sheet interface to minimize adhesion between the donor sheet and the receiving sheet or layer during printing. The polymer system of the receiving sheet or layer can be substantially free from release agents, such as silicone-based oils, poly(organosiloxanes), fluorinated polymers, fluorine- or phosphate-containing surfactants, fatty acid surfactants and waxes. Binder materials for the dyes are immiscible with the polymer system of the image-receiving layer. The most common image-receiving layer polymers are polyester, polycaprolactone and poly(vinyl chloride). Processes for forming such image-receiving layers are also described in detail in these patents; in most cases, the polymer(s) used to form the image-receiving layer are dissolved in an organic solvent, such as methyl ethyl ketone, dichloromethane or chloroform, and the resultant solution coated on to the polymer layer using conventional coating apparatus, and the solvent evaporated to form the image-receiving layer. However, if desired the image-receiving layer can be applied to the polymer layer by extrusion casting, or by slot, gravure or other known coating methods.

Other forms of image receiving layers include image receiving layers for Xerographic printing and inkjet printing. These image receiving layers are applied to substrates such as paper or plastic and comprise materials that enhance reception of ink or dye to the substrate. Image receiving layers for Xerographic printing are sometimes referred to as "laser lock" or "toner lock."

To protect the information that is printed, an additional layer of transparent overlaminate 24 can be coupled to the card blank and printed information. Illustrative examples of usable materials for overlaminates include biaxially oriented polyester or other optically clear durable plastic film.

"Laminate" and "overlaminate" include, but are not limited to film and sheet products. Laminates used in documents include substantially transparent polymers. Examples of laminates used in documents include polyester, polycarbonate, polystyrene, cellulose ester, polyolefin, polysulfone, and polyamide. Laminates can be made using either an amorphous or biaxially oriented polymer. The laminate can comprise a plurality of separate laminate layers, for example a boundary layer and/or a film layer.

The degree of transparency of the laminate can, for example, be dictated by the information contained within the identification document, the particular colors and/or security features used, etc. The thickness of the laminate layers can vary and is typically about 1-20. mils. Lamination of any laminate layer(s) to any other layer of material (e.g., a core layer) can be accomplished using known lamination processes.

In ID documents, a laminate can provide a protective covering for the printed substrates and a level of protection against unauthorized tampering (e.g., a laminate would have to be removed to alter the printed information and then subsequently replaced after the alteration.). Various lamination processes are disclosed in assignee's U.S. Pat. Nos. 5,783,024, 6,007,660, 6,066,594, and 6,159,327. Other lamination processes are disclosed, e.g., in U.S. Pat. Nos. 6,283,188 and 6,003,581. A co-extruded lamination technology appears in U.S. patent application Ser. No. 10/692,463. Each of these U.S. patents and applications is herein incorporated by reference.

The material(s) from which a laminate is made may be transparent, but need not be. Laminates can include synthetic resin-impregnated or coated base materials composed of successive layers of material, bonded together via heat, pressure, and/or adhesive. Laminates also includes security laminates, such as a transparent laminate material with proprietary security technology features and processes, which protects documents of value from counterfeiting, data alteration, photo substitution, duplication (including color photocopying), and simulation by use of materials and technologies that are commonly available. Laminates also can include thermosetting materials, such as epoxy.

Manufacture Environments

Commercial systems for issuing ID documents are of two main types, namely so-called "central" issue (CI), and so-called "on-the-spot" or "over-the-counter" (OTC) issue.

CI type ID documents are not immediately provided to the bearer, but are later issued to the bearer from a central location. For example, in one type of CI environment, a bearer reports to a document station where data is collected, the data are forwarded to a central location where the card is produced, and the card is forwarded to the bearer, often by mail. Another illustrative example of a CI assembling process occurs in a setting where a driver renews her license by mail or over the Internet, then receives a drivers license card through the mail.

A CI assembling process is more of a bulk process facility, where many cards are produced in a centralized facility, one after another. (For example, picture a setting where a driver passes a driving test, but then receives her license in the mail from a CI facility a short time later. The CI facility may process thousands of cards in a continuous manner.).

Centrally issued identification documents can be produced from digitally stored information and generally comprise an opaque core material (also referred to as "substrate"), such as paper or plastic, sandwiched between two or more layers of clear plastic laminate, such as polyester, to protect the aforementioned items of information from wear, exposure to the elements and tampering. U.S. Pat. No. 6,817,530, which is hereby incorporated by reference, describes approaches for manufacturing identification documents in a central issue process.

In contrast to CI identification documents, OTC identification documents are issued immediately to a bearer who is present at a document-issuing station. An OTC assembling process provides an ID document "on-the-spot". An example of an OTC assembling process is a Department of Motor Vehicles ("DMV") setting where a driver's license is issued to a person, on the spot, after a successful exam. In some instances, the very nature of the OTC assembling process results in small, sometimes compact, printing and card assemblers for printing the ID document.

OTC identification documents of the types mentioned above can take a number of forms, depending on cost and desired features. Some OTC ID documents comprise highly plasticized poly(vinyl chloride) or have a composite structure with polyester laminated to 0.5-4.0 mil (13-104.mu.m) poly (vinyl chloride) film on the outside of typical PVC or Composite cards, which provides a suitable image receiving layer for heat transferable dyes which form a photographic image, together with any variant or invariant data required for the identification of the bearer. These data are subsequently protected to varying degrees by clear, thin (0.125-0.250 mil, 3-6 .mu.m) overlay patches applied at the printhead, holographic hot stamp foils (0.125-0.250 mil 3-6 .mu.m), or a clear polyester laminate (0.5-10 mil, 13-254 .mu.m) supporting common security features. These last two types of protective foil or laminate sometimes are applied at a laminating station separate from the printhead. The choice of laminate dictates the degree of durability and security imparted to the system in protecting the image and other data. One form of overlay is referred to as a "transferred panel" or "O-panel." This type of panel refers to a panel in the print ribbon that is transferred to the document with the use of the printhead.

From the standpoint of security, an identification document should be difficult to tamper with and/or provide clear evidence of tampering. In particular, the various layers of the document, including the laminate, should be difficult to separate or intrude into without severely damaging the document and marring the information contained in it.

One way to protect the integrity of a secure document is to use overlaminate technology. Currently, PVC and composite cards used in secure ID documents rely on the overlaminate or a "transferred panel" (e.g., O-panel) to both physically protect the variable data printed on the card and to provide security for this data. In these card systems, the overlaminate is expected to fracture along a plane or tear when a counterfeiter attempts to remove it, resulting in an unusable card. Though this removal typically renders the overlaminate unusable, the remainder of the card is still usable in many cases. In some cases, both are re-usable. This allows the counterfeiter to alter or reuse the personalized card and, if needed, replace the overlaminate or panel with a substitute.

In view of this drawback of existing technology, there is a need for more effective document materials and methods to protect document integrity and prevent successful document alteration and counterfeiting.

The invention provides an image destruct feature for use in secure documents. It also provides secure document structures including this feature and methods for making the feature and documents including it.

One aspect of the invention is an image destruct material comprising a release layer positioned between an image receiving layer and a base layer. The adhesion between the release layer and the base layer is greater than adhesion between the release layer and the image receiving layer. The release layer material can be used in secure documents that have an image receiving layer, such as used for dye diffusion, mass transfer, ink jet, and xerographic printing. For example, particular implementations are designed for identification documents with a D2T2 image receiving layer. In these implementations, for example, the release layer is in the form of a patterned coating under the image receiving layer. After information is printed on the image receiving layer, an overlaminate is applied over it. Removal of the overlaminate destroys the printed image on the receiving layer because the relative adhesive properties of the image receiving layer, overlaminate and release layer cause the image to release with the overlaminate at the locations of the coating whereas the remainder of the image remains with the base layer.

Other aspects of the invention include alternative image destruct materials, release layer formulations, and methods for making image destruct features for secure documents.

BRIEF DESCRIPTION OF THE DRAWINGS

The advantages, features, and aspects of embodiments of the invention will be more fully understood in conjunction with the following detailed description and accompanying drawings, wherein.

Of course, the drawings are not necessarily drawn to scale, with emphasis rather being placed upon illustrating the principles of the invention. In the drawings, like reference numbers indicate like elements or steps. Further, throughout this application, certain indicia, information, identification documents, data, etc., may be shown as having a particular cross sectional shape (e.g., rectangular) but that is provided by way of example and illustration only and is not limiting, nor is the shape intended to represent the actual resultant cross sectional shape that occurs during manufacturing of identification documents.

DETAILED DESCRIPTION

For purposes of illustration, the following description will proceed with reference to ID document structures (e.g., TESLIN-core, PVC-core or Polycarbonate-core, multi-layered ID documents). It should be appreciated, however, that the invention is not so limited. Indeed, as those skilled in the art will appreciate, the inventive techniques can be applied to many other structures formed in many different ways.

Figure 3:
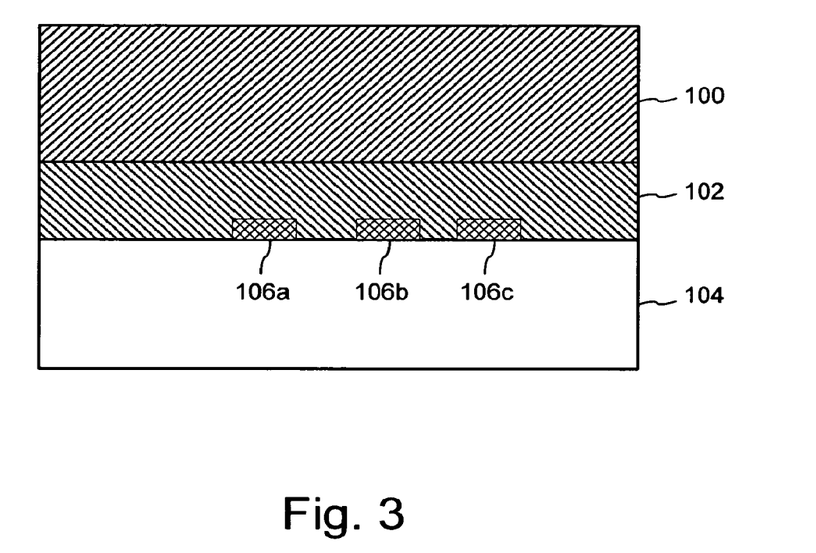
FIG. 3 is a diagram illustrating a cross section of a document structure including a release layer between an image receiving layer and base layer that forms a tamper evident, image-destruct feature.

FIG. 3 is a diagram illustrating a cross section of an identification document including a release layer (e.g., 106a-c) between an image receiving layer 102 and base layer 104 that forms a tamper evident, image-destruct feature. In this embodiment, the release layer is in the form of a patterned coating deposited underneath an image receiving layer 102. The materials of these three layers are chosen such that adhesion of the patterned coating to the base is much greater than adhesion of the coating to the image receiving layer. In particular, the adhesion of the patterned coating to the base is high or fused. Adhesion between the patterned coating and the image receiving layer positioned immediately above this patterned coating is either weak or non-existent. In this embodiment, the patterned coating covers less than the entire surface of the base such that portions of the image receiving layer directly contact the base. The adhesion of the balance of the image receiving layer to the base is equal to or greater than the adhesion of the patterned layer to the base. The release layer can be chemically fused or blended with the base as well making an indestructible bond to the base.

Layer 100 in FIG. 3 represents an overlaminate. For ID document applications, the overlaminate is chosen to protect the printing on the image receiving layer. An example of an overlaminate is a 1 MIL polyester film that is laminated over the image receiving layer after printing and joined to the underlying materials with an adhesive. The overlaminate is typically applied over the entire surface of the ID documents being manufactured. Typically, the image receiving layer covers the entire surface of the document as well. However, it is also possible to place the image receiving layer or layer in selected locations on the document surface. The adhesion between the overlaminate and the image receiving layer is stronger than the adhesion between the image receiving layer and the release layer. When the overlaminate is removed (e.g., as a result of tampering or intrusion by a counterfeiter), the printed image fractures, and the parts of the image over the release layer remain adhered to the overlaminate (e.g., an image in the form of the pattern of the coating goes with the overlaminate). Other parts of the printed image and image receiver layer remain adhered to the base. The adhesive of the overlaminate is such that removal of the overlaminate destroys it. In addition, the weak adhesion of the image receiving layer to the release pattern ensures the destruction of the D2T2 image when the overlaminate is removed.

Preferably, the design of a release layer for use with an image receiving layer has the following objectives: 1) achieve a high level of adhesion to the base; 2) achieve a low or non-existent level of adhesion to the image receiving layer; 3) mitigate interference of the patterned coating with the lay down of the image receiving layer or layers; 4) mitigate interference of the patterned layer with the printing operation; and 5) achieve the first two objectives across the relevant temperature span of interest (typically, room temperature to 230 F).

Particular embodiments of the release layer are designed for use with D2T2 image receiving layers. Regarding item 3, the release layer is chosen to have a non-resolubilization character so that the D2T2 image receiving layer's solvents do not dissolve or excessively soften the release layer. Solvents sometimes cause a swelling and/or softening of a polymer material if they are able to invade that material. The resolubilization character mitigates the impact of any solvent from the image receiving layer on the release layer. As noted, the basic release layer approach also applies for documents having image receiving layers used for inkjet and Xerographic printing.

For secure document applications, the base layer forms part of a document structure typically comprising layers of film fused together. These film layers are input to the manufacturing process as sheets or rolls of film called "webs." The various layers are processed, joined and die cut to form individual documents, such as blank card stock or personalized ID documents. The base web can be a variety of materials used in identification documents, but is typically a polymer film, such as polycarbonate or PVC film, to name a few examples. The specific material used as the base layer may vary, and formulations of the release layer and image receiving layer are designed to accommodate the selected base material.

Figure 4:
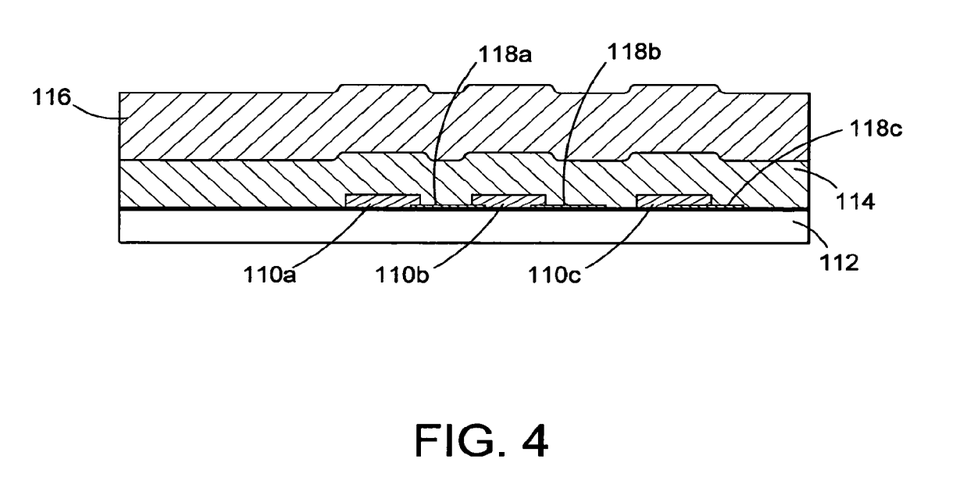
FIG. 4 is a diagram illustrating a cross section of a document structure with an alternative image destruct feature.

FIGS. 3-4 emphasize only pertinent aspects of the overlaminate, image receiving layer, release layer and base layer. A typical ID. document typically has more layers, and the base layer itself may be fused from two or more layers. In one card structure, a light colored, opaque core layer of TESLIN®. or polycarbonate is fused with one or more layers of transparent polycarbonate (e.g., front and back layers). In another, a single or double core of white PVC is fused with clear outer laminate layers. In yet another, outer layers of biaxally oriented polyester reinforce a core layer or layers of PVC. Additional layers as well as alternative card structures can be used with the overlaminate, image receiving layer, and base layers described in this document.

Two specific example embodiments are described further below, followed by a description of a method for making secure, tamper evident ID documents with a release layer.

In a first example embodiment, the release layer is coated out of alcohol and composed of a water soluble polymer and solvent soluble polymer blend. In particular, it comprises KLUCEL® hydroxypropylcellulose/polyamide blend. This blend ensures that there is no resolubilization of the release layer when the D2T2 image receiving layer is coated immediately on top. This results in a relatively flat and low profile patterned coating and is easily integrated into the production process involving the lay down of D2T2 via gravure. FIG. 3 depicts a document structure where the image receiving layer 102 and overlaminate are relatively flat. The size of the elements of the pattern coating (106a-c) are exaggerated in FIG. 3 so that they are more noticeable. In an actual implementation, the patterned coating has a relatively flat and low profile on the surface of the base layer 104, resulting in relatively flat surfaces of both the image receiving layer 102 and overlaminate 100.

FIG. 4 is a diagram illustrating a cross section of a document structure with an alternative release layer. This diagram illustrates the pertinent structure of a second example embodiment, which uses materials and processing that creates a raised, and potentially visible and tactile feature on the surface of the document. This feature can be viewed and felt to verify the presence of the release layer. In this example, the release layer (110a-c) comprises a UV cured formulation applied directly to a base layer 112 (e.g., polycarbonate web) and subsequently cured. This formulation yields a coating proud of the surface. It may require subsequent coatings of D2T2 image receiving layer 114 via slot or reverse roll to apply sufficient fluid so as to not interfere with the first lay down of the release pattern. This process produces a secure card where the feature is quite prominent and when printed leaves a non-dye transferred fringe around the entire pattern. One can easily see this as a "white" border defining the pattern of the release layer. This border remains "white" or "un-printed" (i.e., the color of the base layer) due to the fact that the D2T2 print head does not transfer dye due to the interaction of the printhead, ribbon and surface characteristics of the pattern at the rising and falling edges of the release pattern's borders.

Additionally, the overlaminate 116 is "embossed" when laminated over the printed card's surface taking on the exact proud feature set of the patterned coating. This gives yet another feature in that the secure overlaminate is now embossed in the exact same pattern as the "image destruct" feature. The UV cured coating 110a-c does not change its nature over a wide temperature range (e.g., room temperature to 230 F) rendering the image destruct feature's performance constant over a wide temperature range (for intrusion). This same characteristic allows for the embossing feature to occur since it remains rigid while the lamination occurs.

As an additional security feature, security inks, such as UV, IR, optically variable inks, Pearlescent, etc. ("specialty") inks, are optionally used to print fixed or variable indicia 118a-c on or in the base layer 112. See, for example, U.S. Pat. No. 6,827,277, which is hereby incorporated by reference. In the example shown, the security inks are positioned below portions of the document where the release pattern 110a-c is located. These specialty inks may be printed in a pattern arranged relative to the release pattern to create desired optical effects, such as the appearance of spatially and visually interlocking specialty ink and release patterns that change in color or position as the document is rotated about a viewing angle or illuminated with an illumination source in different wavelength bands. The release pattern and security ink indicia can be located in mutually exclusive locations on the document surface.

Figure 5:
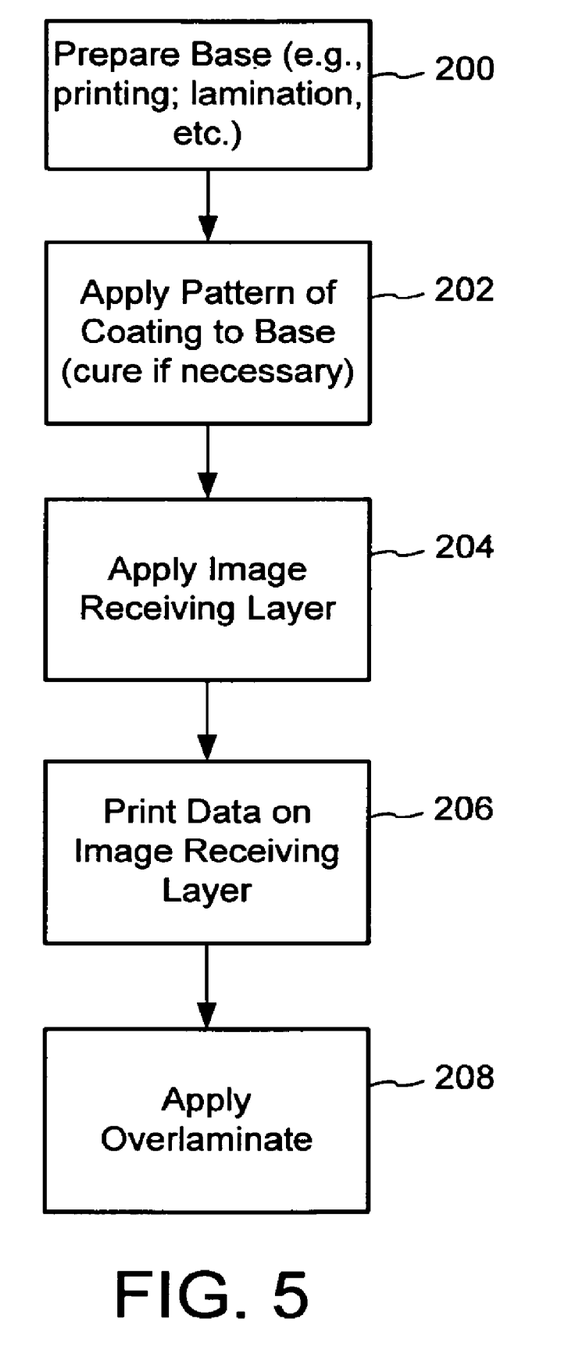
FIG. 5 is a flow diagram illustrating a method of making a secure document with a release layer between image receiving and base layers.

FIG. 5 is a flow diagram illustrating a method of making a secure document with a release layer between image receiving and base layers. First, the base layer is prepared (step 200). Preparation of the base layer may include printing information (such a fixed indicia corresponding to the issuer) on a light-colored, opaque polymer substrate or core layer. Optionally, a transparent film is laminated on the core. The baser layer comprises the core with or without printing or the transparent film.

Next, a coating machine applies the release layer to the base layer (step 202). One such coating machine is a gravure printer. Other coating methods may be used as well. In the case where the coating is a curable material, the base layer with coating applied is cured (e.g., via UV or EB curing). As described above, the coating may be applied to cover selected portions of each document. Examples include applying the coating in the form of a graphical symbol (e.g., seal of the issuer), text, or form of halftone image.

Next, the image receiving layer is applied over the release layer (step 204). It may be applied by extrusion casting, or by slot, gravure or other known coating methods. Examples of image receiving layers are provided below. At this point, individual cards may be die cut from sheets of the document structure and distributed to card issuing facilities as card blanks.

Next, an image is printed on the image receiving layer (step 206). For example, variable, personalized data of the document bearer is printed on the image receiving layer. For OTC ID cards with D2T2 image receiving layers, OTC D2T2 printers are used to print the bearer's photo, personal information, and possibly other data at an issuing facility.

Finally, an overlaminate is laminated onto the card (step 208).

EXAMPLES

In one class of embodiments of our release coating formulation, we blend two type polymers in the release coating. One has stronger release property and the other has better adhesion to both a PVC image receiving coating and polycarbonate substrate. The one with strong release property includes polyvinyl alcohol, polysaccharide, Cellulose, and modified cellulose such as cellulose acetate butyrate, polyvinyl butyral, or hydroxypropyl cellulose (e.g. like KLUCEL®). This type of material has less compatibility with polycarbonate and PVC materials. It mainly functions to break the images on the image receiving layer upon intrusion. The other type of polymer with better adhesion to a PVC image receiving layer coating and polycarbonate layer includes polyamide, polyurethane, polystyrene, or polyacrylate. This type of polymer will act as a bridge to hold a PVC image receiving layer coating on the polycarbonate document material. We prefer to use a blend of polyamide and KLUCEL®. The ratio of polyamide to KLUCEL is ranged from 80/20 to 20/80. And the coating thickness will range from 0.01 to 1 micron. A particular formulation is:

| | |
|---|---|
| KLUCEL ® | 2.5% |
| Polyamide | 2.5% |
| Iso propanol alcohol | 45% |
| n-propanol alcohol | 45% |

The coating thickness is about 0.2 micron.

In another class of embodiments, we use a UV curable release coating. In this case, a UV cured release coating provides strong adhesion to the polycarbonate substrate, but weak bond to the PVC image receiving layer. The coating composition includes a polymer binder, a UV curable oligomer and monomer, and UV curable initiators. The binder includes polystyrene, polyacrylate, or polyester. The binder provides certain adhesion to the PVC coating. Oligomers and monomers include urethane acrylate, epoxy acrylate, and ester acrylate. These materials produce a network structure upon curing.

Example 1 for screen printing:

| | wt. (g) | wt. % |
|---|---|---|
| CN966H90 | 272.11 | 30% |
| SR9041 | 256.08 | 28% |
| SR351 | 82.81 | 9% |
| SR399 | 245.89 | 27% |
| Sr1129 | 48 | 5% |
| Total | 904.89 | 100% |

Example 2 for gravure printing:

| | wt. (g) | wt. % |
|---|---|---|
| Butyl acrylate | | 6% |
| SR9041 | | 5.6% |
| SR351 | | 1.9% |
| SR399 | | 3.4% |
| Sr1129 | | 1% |
| MEK | | 80% |
| Total | | 100% |

The release pattern works in a variety of line widths and graphic image designs.

We have made samples with release patterns in the form of a logo, and different line widths ranging from about 0.01" to 0.03". Currently, we have selected 0.03" line widths for our prototype product. In some embodiments, we form the release pattern as a set of line structures (e.g., a set of wavy lines in parallel applied along the longer dimension of a rectangular ID card).

As noted previously, the release layer technology can be used in a variety of ID card types, including polycarbonate cards, dual polycarbonate and TESLIN® cards, PVC cards, and composite cards (e.g., cards including alternating biaxially oriented polyester and PVC layers). For example in one ID card production process, the process starts with an opaque polycarbonate or TESLIN® core, applies a clear polycarbonate layer to the core, applies the release pattern to the clear polycarbonate layer, applies an image receiving layer over the release pattern, and cuts the result into individual blank card stock. At the time of issuance, a printer prints personal information on the image receiving layer and applies an overlaminate. In some cards, like PVC or composite cards, the core comprises PVC or a combination of polyester and PVC. For such cards, a typical card production process applies a 2-5 mil layer of clear PVC layer over the core, and that PVC layer can function as an image receiving layer. However, to integrate the release pattern, the production process is modified to include application of a release layer over the clear PVC layer, which serves as the base layer, followed by application of an image receiving layer (e.g., another PVC based formulation) over the release layer. As in the other case, the resulting structure is then cut into blank card stock. After printing on the outer image receiving layer at the time of issuance, an overlaminate is applied to complete the card. As this example demonstrates, it is possible to integrate the release pattern into structures that inherently have thermal transfer image receiving layer functionality (such as some forms of PVC cards), as well as card structures that do not.

Below are some examples of D2T2 image receiving layer formulations usable with the above document materials and methods.

Example 1

| Components and Formulation: | |
|---|---|
| | Solid % |
| Solvent MEK(100%) | 89.80% |
| PVC (Oxychem-155) | 10% |
| BYK-306 | 0.20% |
| | 100.00% |

Example 2

| Components and Formulation: | |
|---|---|
| | Solid % |
| Solvent MEK | 86.30% |
| PVC (Oxychem-155) | 13.5% |
| BYK-306 | 0.20% |

The following image receiving layer formulations include a copolymer, plasticizer, and antioxidant. This combination increases printing dye density and film stability.

Example 3

| Component | Stk. % | Total Dry Solid % | Wet Solid % | 15 20.00% Wt. kg |
|---|---|---|---|---|
| VYNS-3 | 100% | 73% | 14.60% | 2.19 |
| Dioctyl phthalate | 100% | 23% | 4.60% | 0.69 |
| IRANOX 245 | 100% | 1% | 0.20% | 0.03 |
| TINUVIN 5050 | 100% | 3% | 0.60% | 0.09 |
| MEK | 100% | | | 12 |
| Total | | 100% | | 15 |

Example 4

| Mixture | Component | Stk. % | Ratio | Total wt solid % Wet Wt % | 50 10.00% Wt. kg |
|---|---|---|---|---|---|
| Solvents | Acetone | 100% | 80 | 72.00% | 36 |
| | Diacetone Alcohol | 100% | 20 | 18.00% | 9 |
| Solids | VYNS-3 | 100% | 73% | 7.30% | 3.65 |
| | Dioctyl phthalate | 100% | 23% | 2.30% | 1.15 |
| | IRGANOX 245 | 100% | 1% | 0.10% | 0.05 |
| | TINUVIN 5050 | 100% | 3% | 0.30% | 0.15 |
| | Total | | 100% | | 50 |

Procedure:
1) Charge acetone into the mixer.
2) Add DOP into acetone solvent with agitation.
3) Add Irganox 245 into the mixer with agitation.
4) Add Tinuvin 5050 into the mixture with agitation.
5) After the mixture solution becomes clear, add VYNS-3 slowly into the mixture with proper agitation
6) After the mixture is fully dissolved, add diacetone alcohol into the final solution and mix for another hour.

Example 5

| Mixture | Component | Stk. % | Ratio | Total wt solid % Wet Wt % | 50 10.00% Wt. kg |
|---|---|---|---|---|---|
| Solvents | Acetone | 100% | 80 | 72.00% | 36 |
| | Diacetone Alcohol | 100% | 20 | 18.00% | 9 |
| Solids | VYNS-3 | 100% | 73% | 7.30% | 3.65 |
| | Dioctyl phthalate | 100% | 23% | 2.30% | 1.15 |
| | IRGANOX 245 | 100% | 1% | 0.10% | 0.05 |
| | TINUVIN 5050 | 100% | 3% | 0.30% | 0.15 |
| | Total | | 100% | | 50 |

Procedure:
1) Charge acetone into the mixer.
2) Add DOP into acetone solvent with agitation.
3) Add Irganox 245 into the mixer with agitation.
4) Add Tinuvin 5050 into the mixture with agitation.
5) After the mixture solution becomes clear, add VYNS-3 slowly into the mixture with proper agitation.
6) After the mixture is fully dissolved, add diacetone alcohol into the final solution and mix for another hour.

Concluding Remarks

Having described and illustrated the principles of the technology with reference to specific implementations, it will be recognized that the technology can be implemented in many other, different, forms, and in many different environments.

The technology disclosed herein can be used in combination with other technologies. Also, instead of ID documents, the inventive techniques can be employed with product tags, product packaging, labels, business cards, bags, charts, smart cards, maps, labels, etc. The term ID document is broadly defined herein to include these tags, maps, labels, packaging, cards, etc.

It should be understood that, in the Figures of this application, in some instances, a plurality of method steps may be shown as illustrative of a particular method, and a single method step may be shown as illustrative of a plurality of a particular method steps. It should be understood that showing a plurality of a particular element or step is not intended to imply that a system or method implemented in accordance with the invention must comprise more than one of that element or step, nor is it intended by illustrating a single element or step that the invention is limited to embodiments having only a single one of that respective elements or steps. In addition, the total number of elements or steps shown for a particular system element or method is not intended to be limiting; those skilled in the art will recognize that the number of a particular system element or method steps can, in some instances, be selected to accommodate the particular user needs.

To provide a comprehensive disclosure without unduly lengthening the specification, applicants hereby incorporate by reference each of the U.S. patent documents referenced above.

The technology and solutions disclosed herein have made use of elements and techniques known from the cited documents. Other elements and techniques from the cited documents can similarly be combined to yield further implementations within the scope of the present invention.

Thus, the exemplary embodiments are only selected samples of the solutions available by combining the teachings referenced above. The other solutions necessarily are not exhaustively described herein, but are fairly within the understanding of an artisan given the foregoing disclosure and familiarity with the cited art. The particular combinations of elements and features in the above-detailed embodiments are exemplary only; the interchanging and substitution of these teachings with other teachings in this and the incorporated-by-reference patent documents are also expressly contemplated.

In describing the embodiments of the invention illustrated in the figures, specific terminology is used for the sake of clarity. However, the invention is not limited to the specific terms so selected, and each specific term at least includes all technical and functional equivalents that operate in a similar manner to accomplish a similar purpose.

What is claimed is:

1. An identification document comprising:
   a base layer;
   a release layer over the base layer, the release layer being applied in a pattern and the pattern covering less than an entire area of the base layer;
   an image receiving layer over the base layer and the release layer, wherein the image receiving layer is in direct contact with the base layer except where the image receiving layer contacts the pattern of the release layer; and an overlaminate layer over the image receiving layer, wherein the adhesion of the release layer to the base layer is greater than the adhesion of the release layer to the image receiving layer and wherein the adhesion of the overlaminate layer to the image receiving layer is greater than the adhesion of the image receiving layer to the release layer, such that removal of the overlaminate layer causes an image printed on the image receiving layer to remain adhered to the overlaminate layer in the area of the release layer while the image printed on the image receiving layer remains with the base layer outside the area of the release layer.

2. The identification document of claim 1, wherein the image receiving layer comprises a D2T2 image receiving layer.

3. The identification document of claim 1, wherein the release layer comprises a water soluble polymer and a solvent soluble polymer, and wherein the release layer includes a material to mitigate swelling or softening in response to applying the image receiving layer on the release layer.

4. The identification document of claim 1, wherein the release layer comprises a UV curable formulation.

5. The identification document of claim 1, wherein the pattern of the release layer is raised.

6. The identification document of claim 5, wherein the image receiving layer is raised in the area of the pattern of the release layer.

7. The identification document of claim 6, wherein the overlaminate layer is raised in the area of the pattern of the release layer.

8. The identification document of claim 1, wherein indicia are printed on the base layer.

9. The identification document of claim 8, wherein the printed indicia is at least partially below the pattern of the release layer.

10. The identification document of claim 8, wherein the printed indicia does not overlap with the pattern of the release layer.

11. The identification document of claim 1, wherein the release layer comprises at least a first polymer and a second polymer.

12. The identification document of claim 11, wherein the first polymer of the release layer is selected from the group of polyvinyl alcohol, polysaccharide, cellulose, cellulose acetate butyrate, polyvinyl butyrate, and hydroxypropyl cellulose.

13. The identification document of claim 11, wherein the second polymer of the release layer is selected from the group of polyamide, polyurethane, polystyrene, and polyacrylate.

14. The identification document of claim 11, wherein the first polymer is hydroxypropyl cellulose and the second polymer is polyamide.

15. The identification document of claim 14, wherein the ratio of polyamide to hydroxypropyl cellulose ranges from 80/20 to 20/80.

16. The identification document of claim 1, wherein the release layer comprises about 2.5% hydroxypropyl cellulose by weight, about 2.5% polyamide by weight, about 45% Iso propanol alcohol by weight, and about 45% n-propanol alcohol by weight.

17. The identification document of claim 1, wherein the release layer ranges from about 0.01 to 1 micron in thickness.

18. The identification document of claim 17, wherein the release layer is about 0.2 micron in thickness.

\* \* \* \* \*